(12) United States Patent
McAllister et al.

(10) Patent No.: US 8,700,464 B1
(45) Date of Patent: Apr. 15, 2014

(54) MONITORING USER CONSUMPTION OF CONTENT

(75) Inventors: Ian A. McAllister, Seattle, WA (US); Sean W. Blakey, Seattle, WA (US); David M. Lifson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 455 days.

(21) Appl. No.: 12/878,917

(22) Filed: Sep. 9, 2010

Related U.S. Application Data

(62) Division of application No. 11/694,844, filed on Mar. 30, 2007, now Pat. No. 7,818,419.

(51) Int. Cl.
*G06Q 30/00* (2012.01)
*G06Q 30/02* (2012.01)

(52) U.S. Cl.
CPC ........ *G06Q 30/0244* (2013.01); *G06Q 30/0242* (2013.01)
USPC .................................... 705/14.43; 705/14.41

(58) Field of Classification Search
USPC ..................................................... 705/14.43
See application file for complete search history.

(56) References Cited

U.S. PATENT DOCUMENTS

| | | | |
|---|---|---|---|
| 5,347,632 A * | 9/1994 | Filepp et al. .................. 709/202 |
| 6,262,724 B1 | 7/2001 | Crow et al. |
| 6,269,361 B1 * | 7/2001 | Davis et al. ........................... 1/1 |
| 7,243,310 B2 | 7/2007 | Crain et al. |
| 7,818,419 B1 | 10/2010 | McAllister et al. |
| 2002/0099605 A1* | 7/2002 | Weitzman et al. .............. 705/14 |
| 2003/0053420 A1 | 3/2003 | Duckett et al. |
| 2004/0103040 A1 | 5/2004 | Ronaghi et al. |
| 2005/0076051 A1* | 4/2005 | Carobus et al. ............... 707/102 |
| 2005/0251448 A1* | 11/2005 | Gropper .......................... 705/14 |
| 2006/0037067 A1* | 2/2006 | Morris et al. ...................... 726/7 |
| 2007/0124693 A1 | 5/2007 | Dominowska et al. |
| 2008/0015929 A1 | 1/2008 | Koeppel et al. |
| 2008/0046562 A1 | 2/2008 | Butler |

OTHER PUBLICATIONS

Fain et al., "Sponsored Search: A brief history", Bulletin of the American Society for Information Science and Technology, vol. 32, No. 2, Oct. 18, 2006.*

"Interactive Audience Measurement and Advertising Campaign Reporting and Audit Guidelines", Interactive Advertising Bureau, Version 6.0b, Sep. 2004, found on line at iab.net/media/file/US_meas_guidelines.pdf.*

Office action for U.S. Appl. No. 13/072,242, mailed on Feb. 25, 2013, McAllister et al, "Monitoring and Replaying User Consumption of Content", 23 pages.

Allen, "Madden NFL 06", retrieved on Aug. 20, 2013, at http://www.ign.com/articles/2005/11/15/madden-nfl-06, IGN Entertainment, 2005, 11 pages.

Office action for U.S. Appl. No. 13/072,242, mailed on Aug. 30, 2013, McAllister et al., "Monitoring and Replaying User Consumption of Conten", 21 pages.

* cited by examiner

*Primary Examiner* — John G Weiss
*Assistant Examiner* — Scott C Anderson
(74) *Attorney, Agent, or Firm* — Lee & Hayes, PLLC

(57) ABSTRACT

Activity monitoring techniques monitor user consumption of content. To perform one of the techniques, event data from users that reflects the consumption of content is collected. The collected event data is analyzed to infer a feature within the content that the users are presumed to have consumed. Based on the analysis, an estimated actual impression measurement that reflects aggregate consumption of the feature within the content by the users is determined.

20 Claims, 9 Drawing Sheets

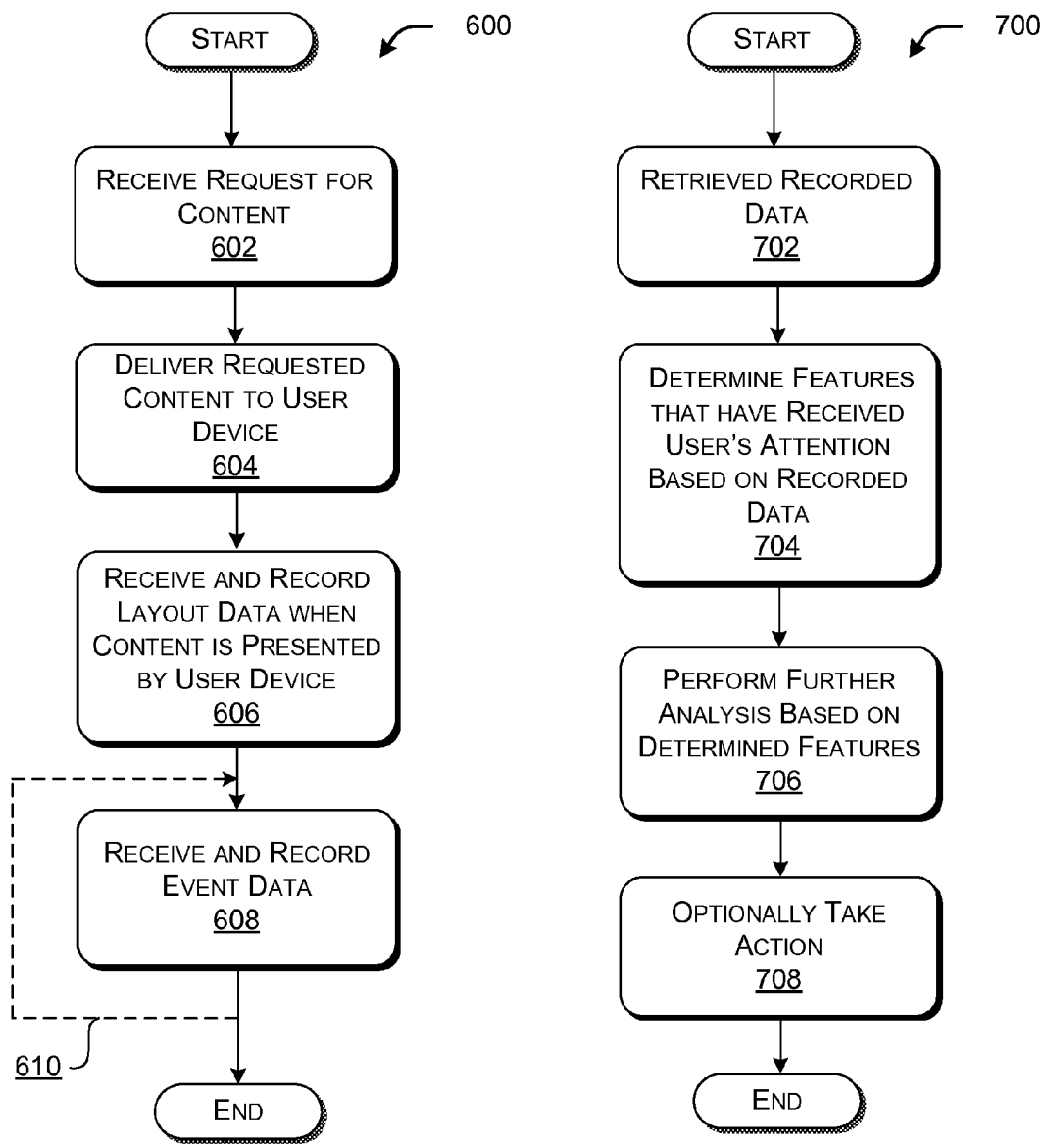
FIG. 6   FIG. 7

MONITORING USER CONSUMPTION OF CONTENT

CROSS-REFERENCE TO RELATED APPLICATIONS

This patent application is a divisional application of co-pending, commonly-owned U.S. patent application Ser. No. 11/694,844, entitled "Monitoring User Consumption of Content", filed on Mar. 30, 2007, which application is incorporated herein in its entirety by reference.

BACKGROUND

It is common for a network-accessible service to monitor the activity of a user who is interacting with the service. In one typical case, the service can deliver content to a user that includes various selectable features. The service can then register the user's express selection of these features. For instance, the service can deliver a page of content that includes one or more advertisements. The service can record each time the user selects these advertisements, such as by clicking on these advertisements or making some other express action that is directed at these advertisements. This type of monitoring can be performed for a collection of users to provide a general measure of how effective the features are in achieving a desired end result, such as eliciting the user's selection of the features. Such measurements, in turn, can be used to better assess the value of the features (for example, to better set the price charged for advertisements). In another typical case, the service can monitor the manner in which a user navigates from page to page within the service, such as by clicking on a link which activates a new page.

A user can be said to consume content by engaging or interacting with the content in any manner. One way of consuming content is by making the above-described types of express actions within a page, such as by clicking on various features in the content. However, a user's consumption of network-delivered content may not always be adequately represented by the user's mouse clicks or the user's movement from page to page within the content. In some cases, for example, a user may examine a part of a page, yet may not perform any express action with respect to that part. For example, the user may study a feature within the page, yet fail to click on this feature; this may be because the feature is non-selectable or the user simply declines to click on the feature. The feature nonetheless can be considered successful in engaging the user. Known techniques do not provide a suitably efficient mechanism for monitoring the user's consumption of content in these types of circumstances. As a result, a network-accessible service may fail to generate a sufficiently accurate understanding of how the user is engaging the service. As a further result, the service may fail to efficiently utilize and/or price its resources.

SUMMARY

In one illustrative implementation, an activity monitoring strategy is described which monitors a user's consumption of content at a user device. The strategy can be manifested in various systems, apparatuses, methods, protocols, computer readable mediums, data structures, and other forms. The activity monitoring strategy first collects layout data that reflects the layout of the content as presented by the user device. The activity monitoring strategy then collects event data that reflects user consumption within the content. The activity monitoring strategy asynchronously sends the collected data to a data analysis module. The data analysis module analyzes the collected data to determine features in the content that the user is presumed to have consumed.

The collected event data may have an indirect or inferential relation to the features that the user is presumed to have viewed. For instance, the event data can include scrolling event data that reflects scrolling activity performed by the user. The event data can also include dimension-modifying event data that reflects, in one case, modifications to the dimensions of a panel used to present content to the user. The event data can also include focus-switching event data that indicates that the user has shifted his or her focus away from a portion without deactivating the portion, or that the user has switched back to the portion, such as when the user switches from one tabbed active page to another tabbed active page, or when the user switches from an active page to an application. The event data can also include graphical position-modifying event data that reflects movement of a graphical positioning device (such as a mouse device) that causes a corresponding movement of a graphical mark (such as a cursor or arrow, etc.) within the displayed content. By virtue of the use of this data, the strategy can gauge the user's interest in features even in those circumstances in which the user has not expressly clicked on these features or taken other express actions with respect to these features.

The activity monitoring strategy can use client-side program-based functionality (e.g., script-based functionality) to implement the collecting and reporting of layout data and event data. By virtue of this provision, in one implementation, the strategy can collect data without installing specialized functionality at the user device.

The activity monitoring strategy can use the results of its analysis in different ways. In one case, the activity monitoring strategy can use the results of its analysis to modify the content. In another case, the activity monitoring strategy can use the results of its analysis to set or adjust a price charged for various features in the content (such as advertisements). Additional illustrative implementations are described in the following.

BRIEF DESCRIPTION OF THE DRAWINGS

FIG. 6 shows an illustrative procedure for collecting layout data and event data from a browser module.

FIG. 7 shows an illustrative procedure for processing event data and layout data.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for monitoring a user's consumption of network-delivered content. The strategy can be manifested in various systems, apparatuses, methods, protocols, computer readable mediums, data structures, and other forms.

This disclosure includes the following sections. Section A describes an illustrative environment for performing the strategy. Section B describes illustrative procedures that explain the operation of the environment of Section A.

A. Illustrative Environment

As a preliminary matter, the terms logic, module, component, functionality, or system (or the like) generally represent hardware, software, firmware or a combination of these elements, or yet some other kind of implementation. For instance, in the case of a software implementation, the terms logic, module, component, functionality, or system (or the like) represent program code that performs specified tasks when executed on a processing device or devices (e.g., CPU or CPUs). The program code can be stored in one or more machine-readable media.

The term machine-readable media or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one point to another.

A.1. Overview of the Environment

The activity monitoring strategy can be applied in various environments, including a network environment, a stand-alone environment, or some other type of environment. In a network environment, the activity monitoring strategy monitors the user's consumption of network-delivered content. In a local environment, the activity monitoring strategy monitors the user's consumption of content which is delivered from one or more local sources. Many of the examples which follow describe the activity monitoring strategy in the context of a network environment; however, the principles described with respect to the network environment can also be applied to a local environment, or yet some other type of environment.

Figure 1:
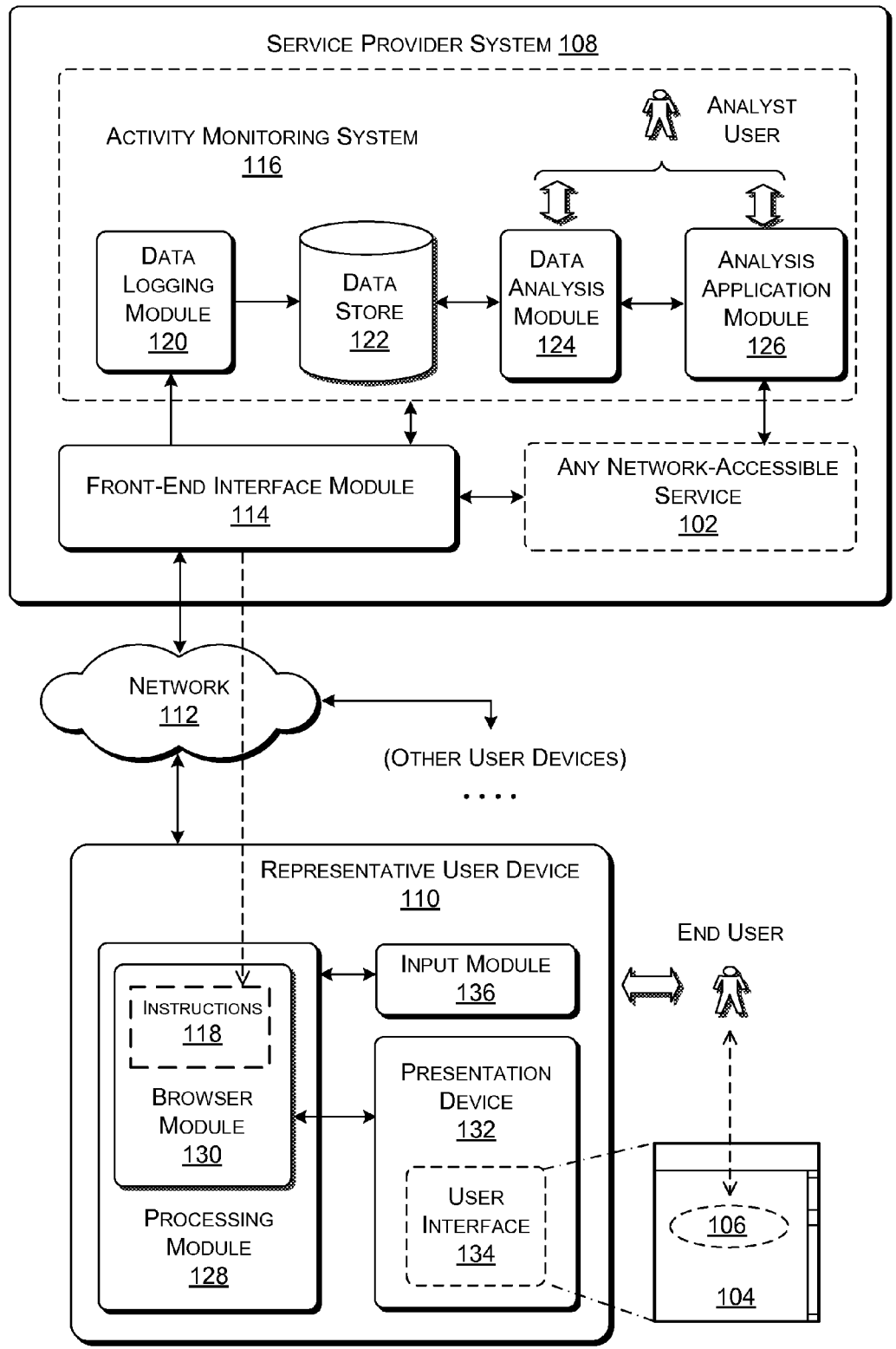
FIG. 1 shows an illustrative environment for monitoring consumption of content, such as content delivered over a network to a browser module.

FIG. 1 shows one illustrative network environment 100 for monitoring the activity of a user who interacts with a network-accessible service 102 (referred to as a "service" for brevity). The service 102 may allow the user to perform any type of function or combination of functions. In one non-limiting case, the service 102 can allow the user to purchase or otherwise acquire items. In another case, the service 102 can allow the user to access and consume media content (such as news-related media content, etc.). The environment 100 can accommodate any other type of service or combination of services. In a local environment (not shown), the service may represent any function or combination of functions which is local with respect to the user.

The service 102 provides content to the user. The service 102 may deliver this content in the form of a collection of pages. For example, a merchandising service can provide a collection of detail pages that provide information regarding items that can be purchased (or otherwise acquired) by a user. A page may have a length and/or width which exceed the respective length and/or width of a user interface panel used to display the page. In this case, the user may access different portions of such a page by operating one or more scroll bars in a conventional fashion. The use can also adjust the dimensions of the user interface panel, making the panel larger, smaller, or changing the dimensions of the panel in some other way or combination of ways. Through this action, the user interface presentation may display different portions of the content. The user can interact with the content in additional ways, to be described below.

FIG. 1 shows a representative page 104 delivered by the service 102. The page 104 can be presented in a user interface panel (such as a window-type display panel). The page 104 includes one or more features, such as representative part 106. A feature of a page may correspond to any identifiable part of the page, such as an advertisement that appears on the page, a section of the page that provides prescribed functionality or imparts a certain type of information, and so forth. A feature (such as a customer review section) may include various subparts (such as an individual review within the review section). Each of these subparts also corresponds to a feature. A feature may also belong to a general class of features (for example, a customer review section may correspond to an instance of a set of community review features). Such a general class also corresponds to a feature.

A user can consume various parts of the content. As broadly used herein, a user can consume content by interacting or engaging with the content in any way or any combination of ways. In some cases, part of the user's consumption of a feature involves making an express action which targets the feature, such as by selecting the feature (e.g., by clicking on the feature). In other cases, the user consumes a feature by viewing the feature, e.g., by reading text associated with the feature, looking at an image associated with the feature, and so on. A user can consume a feature in yet other ways.

Broadly stated, the environment 100 includes functionality for monitoring the user's consumption of content delivered by the service 102. More specifically, the environment 100 is operative to collect event data which reflects the manner in which the user consumes the page by engaging with it in any manner. One type of event data corresponds to scrolling event data. This type of event data is produced when the user scrolls the page 104 up and down or left and right or in some other manner. Another type of event data corresponds to dimension-modifying event data. This type of event data is produced when the user changes the dimensions of a user interface panel that is used to present the page 104, such as by changing the width of the panel, and/or the height of the panel, or by changing the user interface panel in some other way. Another type of event data corresponds to focus-switching data. This type of event data is produced when the user changes focus from one portion of content to another portion of content, such as when the user changes focus from one tabbed active page to another tabbed active page, or when the user switches from a page to an application that is active on the user's desktop, and so on. The focus-switching event data itself reflects switching away from a portion and switching back to the portion. Another type of event data corresponds to graphical position-modifying data. This type of event is produced when the user moves a graphical positioning device (such as a mouse device), which may causes a graphical mark (e.g., an arrow, cursor, etc.) to move within the user interface presentation. The environment 100 can collect yet other kinds of event data. As will be described in detail below, the environment 100 can rely on executable client-side functionality to collect the event data, such as script-based functionality.

The environment 100 uses the collected event data to determine the feature that the user is consuming within the page 104 at any given time. For example, consider the case in which the user activates a vertical scroll bar to move the page 104 so that the feature 106 is positioned at the center of the user's display screen. Based on collected scrolling event data, in conjunction with knowledge of the layout of the page 104 as a whole, the environment 100 can determine that the user is probably looking at the feature 106. The environment 100 can aggregate this type of analysis with respect to a collection of users. Based on this aggregative analysis, the environment 100 can determine how many users have likely viewed the feature 106. The environment 100 can use this knowledge to optimize the page 104, to make price-related decisions regarding the feature 106, and so on.

The environment 100 thereby provides a mechanism for monitoring user consumption of features within the page 104 without, in some cases, requiring the user to make express actions which target those features. For instance, the environment 100 can determine that the user has viewed feature 106 without requiring the user to expressly select this feature 106, e.g., by clicking on this feature or otherwise making an action which narrowly targets this feature. By virtue of this capability, the activity monitoring strategy can potentially provide a more nuanced and reliable indication of the user's consumption of various features on the page 104.

With the above introduction, the individual components of FIG. 1 will be explained as follows. It should be noted that FIG. 1 shows one illustrative and non-limiting way of implementing the above-described operations. Other environments can rely on a different combination of components to implement the operations. To repeat, FIG. 1 shows a network-related implementation of the activity monitoring strategy, but the principles described herein can be applied to a local environment implementation, or some other implementation.

Figure 5:
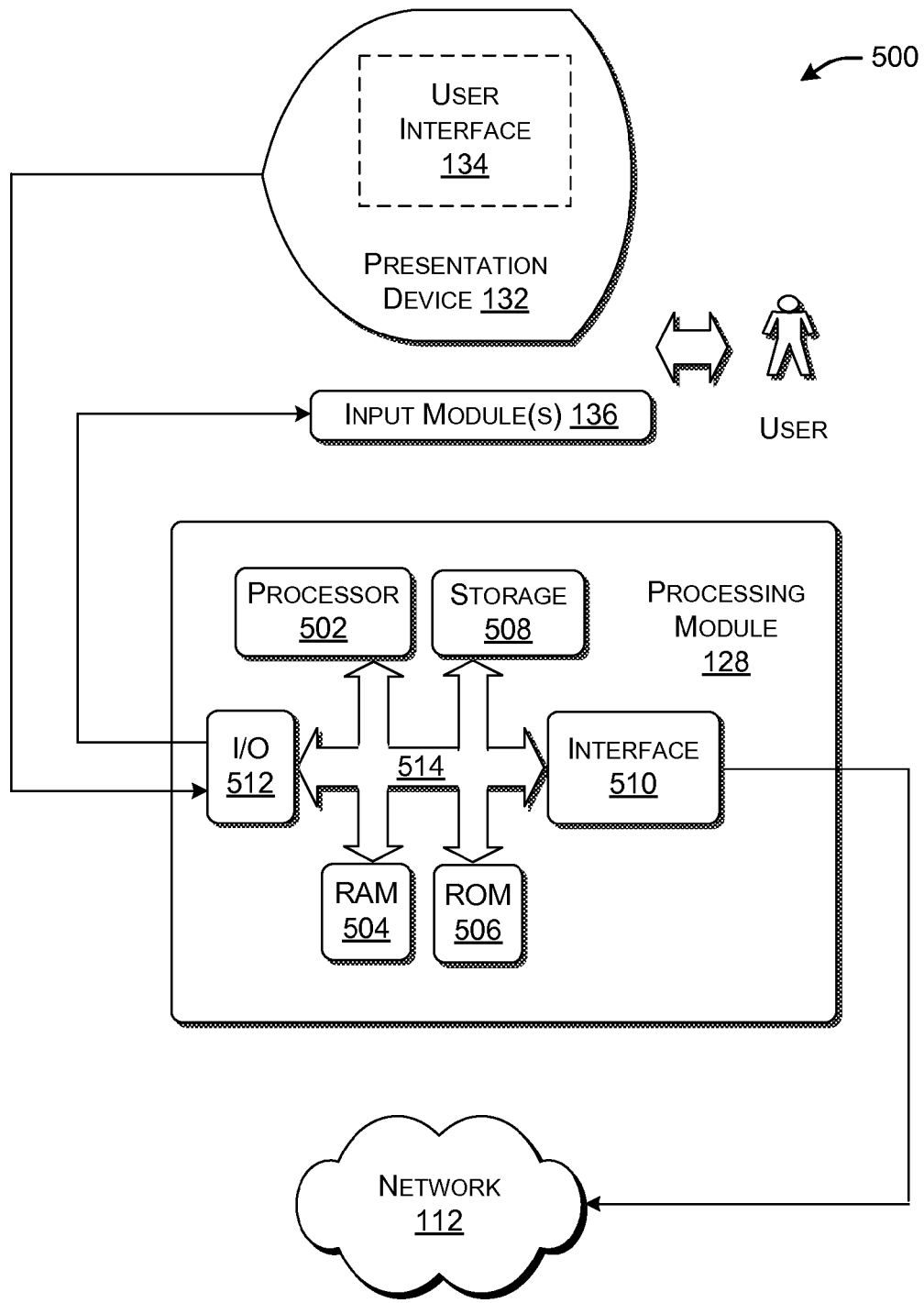
FIG. 5 shows illustrative processing functionality for implementing any aspect of the environment shown in FIG. 1.

The environment 100 includes a service provider 108 that is communicatively coupled to a plurality of user devices, such as representative user device 110. The service provider 108 can communicate with the user device 110 via a network 112. In one implementation, the service provider 108 may represent one or more network-accessible systems for delivering one or more services, such as service 102. For instance, the service provider 108 may correspond to one or more network-accessible server-type computers, storage devices, and/or other data processing equipment. In one implementation, the user device 110 may correspond to any kind of processing device that can be operated by a user to interact with the service provider 108. For instance, the user device 110 can represent a personal computer device, a lap-top computer, a personal digital assistant (PDA) device, an electronic reader device, a mobile telephone, a game console, a set-top box, or any other type of processing device. FIG. 5 (to be described below in turn) shows general processing functionality that can implement any aspect of the environment 100 of FIG. 1.

In one implementation, the network 112 may represent a wide area network (such as the Internet), a local area network, or some combination thereof. The network 112 can include any combination of hardwired and/or wireless links, routers, gateways, name servers, and so on. The network 112 can be governed by any protocol or combination of protocols.

Addressing the functionality of the service provider 108 first, this component includes a front-end interface module 114 for interacting with the user device 110. The front-end interface module 114 can, in turn, interact with one or more backend systems of the service provider 108. For example, the front-end interface module 114 can interact with the network-accessible service 102. The front-end interface module 114 can also interact with an activity monitoring system 116. As the name suggests, the purpose of the activity monitoring system 116 is to monitor the activity of the user who is consuming the network-delivered content, such as the page 104. In other words, one purpose of the activity monitoring system 116 is to analyze the user's consumption of the content.

FIG. 1 shows that a single service provider 108 (possibly representing a single network-accessible site) can implement both the service 102 and the activity monitoring system 116. But in another implementation, different systems can implement the service 102 and the activity monitoring system 116, respectively. In this case, for example, a first system can provide the service 102 and a second system can monitor the user's engagement with the service 102. In another case, the activity monitoring system 116 can be implemented at a site which is local with respect to the user device 110. For example, the user device 110 can implement the activity monitoring system 116. In the local analysis scenario, the user device 110 can receive network-accessible content from the service 102, and/or from a local source and/or from some other source. Still other implementations are possible. More generally, the illustrated components of the service provider 108 can be located at the same site or distributed over plural sites in any manner.

The service 102 can deliver content to the user over the network 112 in the form of one or more pages, such as representative page 104. The page 104 can include user-presentable content and executable content, such as, but not limited to, script-based content. The user-presentable content represents content that can be presented (e.g., displayed) to the user at the user device 110. The executable content can correspond to a program that executes on the user device 110. When executed, the executable operates to record the user's interaction with the page 104. The executable content also instructs the user device 110 to forward collected event data to the service provider 108 for analysis. The executable content can be implemented using different types of scripting technologies, such as JavaScript, JScript, VBScript, etc., or some other type of programming technology or combination of programming technologies.

FIG. 1 illustrates the receipt of executable content from the service provider system 108 by showing an arrow from the service provider system 108 to executable content 118 in the user device 110. In a local environment, the user device 1108 may receive the executable content 118 from a local source or some other source or combination of sources.

The activity monitoring system 116 includes various components for processing the event data collected by the user device 110. For instance, the activity monitoring system 116 includes a data logging module 120 and a data store 122. The purpose of the data logging module 120 is to receive data collected by the user device 110 and to store this data in the data store 122. In one case, the data logging module 120 can collect the above-described type of indirect event data, such as scrolling event data, dimension-modifying event data, and so on. This event data can be considered indirect event data or inferential event data in that the user's consumption of a particular feature is not necessarily revealed by the user's express selection of this feature. Rather, for this type of indirect event data, the user's consumption of a feature may be inferred by non-specific actions that the user may take while navigating within the content (such as by scrolling the content, changing the dimensions of a user interface panel, etc.) or switching focus from one portion of content to another. In another case, the data logging module 120 also collects event data that does in fact reflect express selections made by the user, including click data and other targeted behavior exhibited by the user.

The activity monitoring system 116 also includes a data analysis module 124. The data analysis module 124 can perform various levels of analysis on data stored in the data store 122. For instance, the data analysis module 124 identifies the feature or features that the user has likely consumed while interacting with the page 104. In other words, in one case, the data analysis module 124 determines what feature or features the user is likely to have viewed while interacting with the page 104. For instance, in the example set forth above, the user manipulates a vertical scroll bar to move the page 104 so that feature 106 is centered in the middle of the user's display screen. Based on scrolling event data which captures the scrolling behavior, in conjunction with layout data which captures the overall layout of the page 104, the data analysis module 124 can determine that the user has probably focused his or her attention on the feature 106, and has thereby consumed this feature, as this term is broadly used herein.

In performing its analysis, the data analysis module 124 can also consider time information forwarded to the activity monitoring system 116 by the user device 110. The time information identifies the time at which various events occurred that that are associated with the collected event data. From this time information, the data analysis module 124 can estimate the length of time that the user consumed the feature 106, referred to herein as "length-of-consumption" information. For example, assume that, at time $t_0$, the user moved the vertical scroll bar so that feature 106 was centered in the middle of a user interface presentation. Assume next that at time $t_1$, the user scrolled to a lower portion of the page 104. The data analysis module 124 can infer that the user remained on feature 106 for a length of time $\Delta t$ corresponding to $t_1$-$t_0$. The data analysis module 124 can apply various rules in interpreting such length-of-consumption information. For example, if $\Delta t$ is smaller than a predetermined threshold, the data analysis module 124 can conclude that there is a low probability that the user actually viewed the feature 104, as the user may have only quickly scrolled past the feature 106 to reach another feature on the page 104. Similarly, if $\Delta t$ is particularly long, this may indicate the user is not actively engaging the content, but may have left the room without closing the page 104, etc. Further, the data analysis module 124 can apply different rules and/or thresholds for different types of features having different respective characteristics. For example, the data analysis module 124 can set a threshold which varies in proportion to the size of the feature, meaning, for instance, that the data analysis module 124 can apply a larger threshold for a larger feature. This is based on the assumption that a user's consumption of a large feature is potentially more ambiguous than a user's consumption of a small feature, and therefore requires more time to resolve. For instance, if the user has taken the effort to narrowly focus on a small feature, it is likely that the user is actually looking at this feature; and, as such, the user's intention can be resolved in a relatively short amount of time. The rules applied to features may also vary depending on the context in which the features are displayed.

The above-described analysis of time information is one example in which the data analysis module 124 takes into consideration a sequence of the user's actions while consuming the page 104. More generally, the data analysis module 124 can apply the results of its analysis to reconstruct the course of a user's consumption of the page 104. For example, the data analysis module 124 can determine that the user likely viewed feature X, followed by feature Y, followed by feature Z. The data analysis module 124 can also provide information regarding the intervals of time associated with the user's transition from feature X, to Y, to Z. The data analysis module 124 can "replay" such a sequence of events for analysis in various forms, such as by displaying information regarding these events in a chronological list, representing these events on a timeline, showing automated animation that mimics the actions made by the user in the user interface presentation, and so on.

The data analysis module 124 can also correlate the user's consumption of a particular feature (e.g., as reflected by scrolling event data, dimension-modifying event data, etc.) with other event data that may reflect the user's express selection of one or more features. More specifically, as explained above, in addition to the above-described type of indirect or inferential event data, the data logging module 120 can also collect and store event data that reflects express selections made by the user. For example, the user may make an express selection when the user clicks on a particular feature, which may cause the user to be redirected to another page. The data analysis module 124 analyzes this data to determine the nexus between the user's indirect-type behavior with the user's express selections. Often, the indirect-type behavior precedes one or more express selections. For example, the data analysis module 124 can determine, based on scrolling event data, that the user likely viewed a particular customer review on a detail page; this consumption may be followed by the user's purchase of the item being described by the detail page. The data analysis module 124 can also identify longer sequences of events that may have led to certain express actions or a series of express actions. In one case, the data analysis module 124 may be particularly be interested in the last feature that the user consumed before making an express selection. The data analysis module 124 can also, or alternatively, identify the features that the user consumed after making an express selection. For example, the data analysis module 124 can determine that the user purchased a particular item and then viewed a "related items" feature on the page (where such a feature invites the user to consider other items which are related to the user's purchase).

More generally, the data analysis module 124 can determine how the user's indirect or inferential type of behavior is related to one or more actions which the service 102 may desire the user to take for any reason. Purchasing an item is only one type of desired action. In another case, the service 102 may also desire that the user place an item into his or her shopping cart. In another case, the service 102 may desire the user to click on a link to explore another page. In another case, the service 102 may desire that the user fill out a particular form, register for a particular service, enter a bid, and so on. In another case, the service 102 may desire that the user make a contact with a sale representative or other person or entity. In summary, what constitutes a "desired action" is environment-specific. Through its analysis, the data analysis module 124 can help determine what features on a page are effective in eliciting desired user behavior. For example, the data analysis module 124 can determine that placing a particular image on a detail page is effective in eliciting purchases of the illustrated item. Viewed from the opposite perspective, the data analysis module 124 can also determine features that may be having a negative impact on eliciting a desired action.

To facilitate discussion, the above behaviors were described in the context of a single user consuming the page 104 in a particular instance. The data analysis module 124 can also perform aggregative analysis which considers multiple instances of the consumption of a feature. For example, the data analysis module 124 can determine the manner in which a particular user has consumed content containing one or more features on multiple occasions. The data analysis module 124 can also determine how a particular group of users has consumed content containing one or more features. The data analysis module 124 can make various types of aggregative analysis, such as by determining various counts, averages, rates, standard deviations, probabilities, and/or various other measures.

Through its aggregative analysis, the data analysis module 124 can determine an estimated actual impression measurement. Traditionally, in a CPM model of pricing, an advertiser is charged a fee for a predetermined number of ad presentations to users, e.g., 1000 presentations. In such traditional systems, the parties involved may have a loosely formed expectation that an estimated fraction of people may actually look at (e.g., consume) an advertisement when presented. In contrast, an estimated actual impression measurement can reflect actual measurements of the user's likely consumption of the feature. For example, the data analysis module 124 can determine that a feature was presented 1,000 times to a collection of users, and that 200 users are considered to have actually consumed this feature based on scrolling event data and/or some other event data. Still other rate-type determinations can be made to provide an estimate of how many people are actually consuming a feature.

The activity monitoring system 116 can also include an analysis application module 126. The analysis application module 126 (and/or some other module in the environment 100) can take various actions based on the data analysis performed by the data analysis module 124. In one case, for instance, the analysis application module 126 can modify the page 104 or some other content based on the results of the data analysis module 124. Alternatively, or in addition, the analysis application module 126 can provide instructions which enable another module, such as the service 102, to modify the content it provides to the user device 110. FIG. 1 represents this modification by an arrow which connects the analysis application module 126 and the service 102. For example, upon determining that the feature 106 enjoys a relatively high estimated actual impression measurement, the analysis application module 126 can instruct the service 102 to display the feature 106 in a more prominent location within the page 104, increase its size, or make some other modification. The motivation underlying this change is to more fully exploit a feature that has proven effective in capturing the attention of users. Conversely, the analysis application module 126 can provide instructions which de-emphasize or outright omit a feature that users do not appear to be consuming. Alternatively, the analysis application module 126 can provide general information to the service 102 regarding the consumption of the feature 106, and the service 102 itself can decide how to modify the page 104 based on this general information.

The analysis application module 126 can also use the results the data analysis module 124, such as the estimated actual impression measurement, to help determine how to price features, particularly, but not limited to, advertisements. For example, consider the case in which the feature 106 corresponds to an advertisement. An advertiser may have arranged with a publisher to display its advertisement near the bottom of a page, which is generally regarded as not the most favorable location to place an advertisement to elicit desired user action. For instance, in accordance with this non-optimal placement, the advertiser may have been charging X amount to present the advertisement, rather than a higher Y amount (which is charged to advertisers who display their advertisement on the top of the page or in some other more preferred location). But now assume that estimated actual impression measurements reveal that the advertisement is more popular than previously thought when displayed near the bottom of the page as near the top. Based on this finding, the publisher can decide to charge the advertiser a higher amount, such an amount $X+X_{offset}$. For example, the analysis application module 126 can use the estimated actual impression measurement to actually charge the advertiser for the user's consumption behavior that has been measured. For example, the analysis module 126 can retroactively inform the advertiser that 7,000 users likely viewed its feature in the last month, and charge the advertiser accordingly for that past consumption. The analysis application module 126 can use other approaches to determine price based on the results of the data analysis module 124.

As mentioned above, the data analysis module 124 and analysis module 126 can partition the processing that they perform in various ways. In one case, the data analysis module 124 can determine the consumption habits of a particular user over a given timeframe, such as a week, month, year, etc. For example, the data analysis module 124 can determine that, over time, a particular user often views feature A, but often rapidly scrolls by feature B. In another case, the data analysis module 124 can determine consumption habits of a group of users. The data analysis module 124 can define a group in various ways. In one case, the data analysis module 124 can examine the behavior of a group of users that share the same gender, age, geographic location, or educational level, and so on, and/or any combination of such characteristics. The analysis application module 126 can further apply its analysis with respect to a particular user, a particular group of users, or all users, and so on. For example, the analysis application module 126 can use the estimated actual impression measurements to provide customized content on a per-group or per-user basis.

In those cases where the analysis application module 126 makes changes (e.g., by modifying content or adjusting the cost assigned to features, etc.), it can do so in different ways. In one case, the analysis application module 126 can make changes on a periodic basis, such as once a day, once a week, and so on. In another case, the analysis application module 126 can make changes when there is a significant change in the impression measurements (compared to prior calculations of the impression measurements). In another case, the analysis application module 126 can make changes in a substantially real-time manner, that is, by making changes as event data is collected and analyzed.

Further, different services may use the data analysis module 124 and the analysis application module 126 in different ways depending on the nature of the services. For example, consider a service which provides network-accessible news content to the user. The analysis application module 126 can display news articles that many people appear to be reading at a prominent part of a page (e.g., at the top of a long page having multiple page views).

Figure 2:
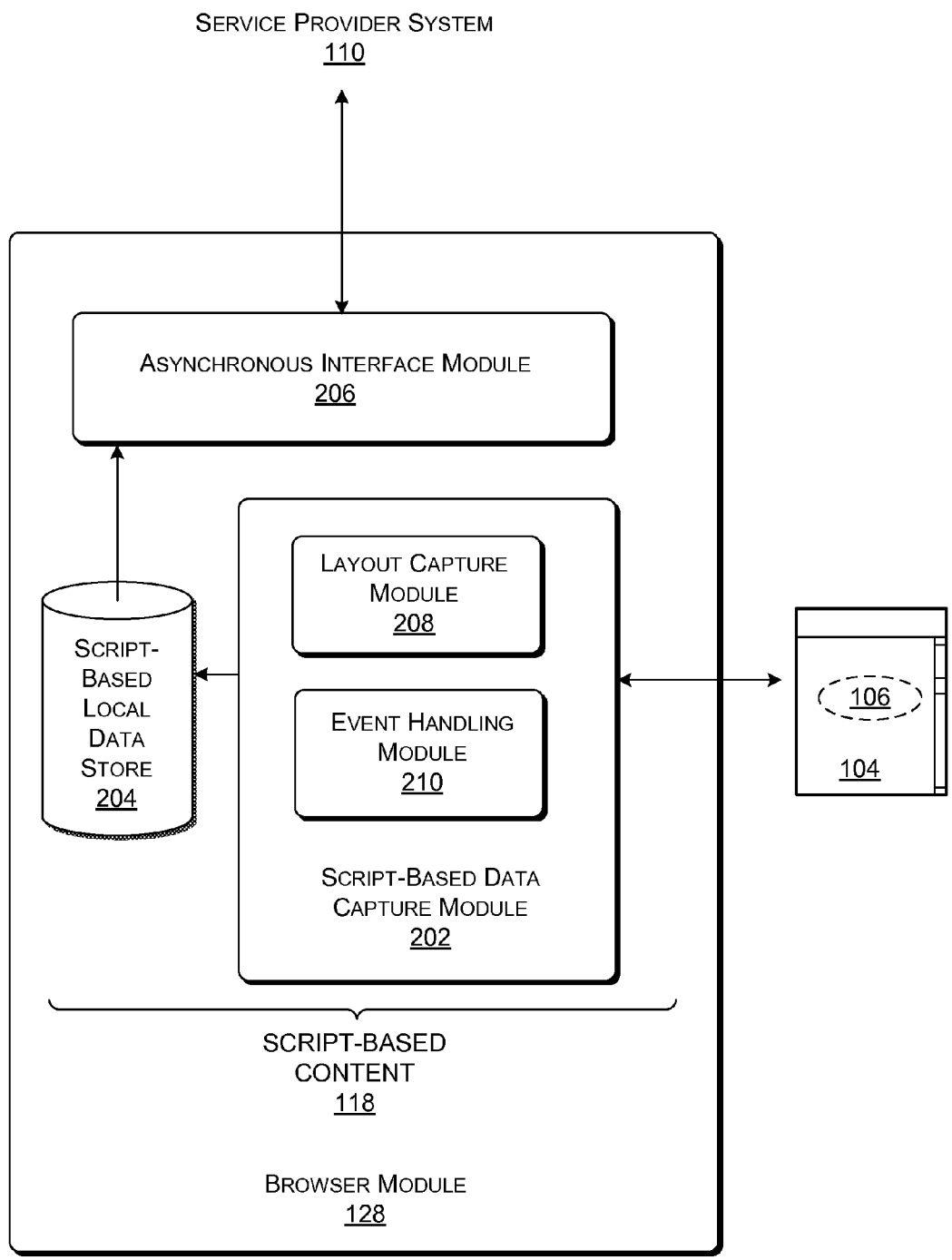
FIG. 2 shows an illustrative browser module for use in the environment of FIG. 1, the browser module including a program-based data capture module for capturing event data.

Now turning to the client-side aspects of the environment 100, the representative user device 110 includes a processing module 128 for processing data. The processing module 128 includes a browser module 130. The purpose of the browser module 130 is to interact with the service provider 108 to retrieve content (such as the page 104) and then to present the content to the user. The purpose of the browser module 130 is also to receive event data which reflects the user's consumption of the content and to forward the event data to the activity monitoring system 116. FIG. 2, to be described below, shows illustrative detail of the browser module 130. To facilitate discussion, FIG. 2 emphasizes the components of the browser module 130 that perform data collection operations, omitting other components of the browser module 130 which perform a traditional role of accessing and displaying page content.

The user device 110 also includes a presentation device 132 for presenting the content. The presentation device 132 can comprise any mechanism for outputting the content to the user via a user interface presentation 134. The presentation device 132 may correspond to a computer monitor, a television screen, and so forth.

Finally, the user device 110 also includes an input module 136. The input module 136 represents any device or combination of devices for receiving input from the user, such a keyboard, a mouse device, and so on.

A.2. Illustrative Browser Module

FIG. 2 provides additional detail regarding the browser module 130 that can be used in the user device 110 of FIG. 1. More specifically, FIG. 2 shows a browser module 130 that can be used to interact with the service provider system 108 in the network environment 100. In a local environment (not shown), a browser module, as this term is generally used, can be used to retrieve, present, and interact with information that may be obtained from a local source (with respect to the user device 110).

Generally, the browser module 130 can represent any type of functionality for presenting content (such as the page 104) from the service provider 108 and for allowing users to interact with the content. The browser module 130 is also capable of executing the executable content 118 that accompanies the displayable page content. The executable content 118 directs the browser module 130 to perform various actions. In the context of the present disclosure, the executable content 118 directs the browser module 130 to collect various data regarding the layout of a page and the activities of the user in interacting with this page. The executable content 118 then forwards this data to the activity monitoring system 116.

The browser module 130 includes the ability to execute script-based instructions (or other program instructions); but beyond that, the browser module 130 need not incorporate specialized functionality to perform the above-described monitoring role. For example, the browser module 130 need not install specialized software modules (e.g., "plug-ins") or specialized monitoring hardware to perform its monitoring functions. This characteristic of the strategy is advantageous because it allows the service provider 108 to determine the actions of users using conventional browser technology that the user devices may already include. This strategy can be viewed as "non-invasive" in the sense that it does not require specialized modification of the user device 110. As stated, the logic used to perform the monitoring functions is embodied in the executable content 118. However, in another implementation, the browser module 130 itself can incorporate specialized functionality for performing the monitoring.

The browser module 130, when configured by the executable content 118, provides a data capture module 202 and a local data store 204. The purpose of the data capture module 202 is to capture various data regarding the page 104 that is being presented on the user interface 134 and the user's interaction with that page 104. The data capture module 202 can store the collected data in the data store 204. In one case, the data store 204 may be implemented using one or more variables in the executable content 118 which, when the content 118 is executed, serve to retain event data.

The browser module 130 also includes an asynchronous interface module 206. The purpose of the interface module 206 is to forward data stored in the data store 204 to the data logging module 120 of the service provider 108. After forwarding the data, the data store 204 is flushed and remains ready to receive new data from the data capture module 202. The operation of the interface module 206 is asynchronous. This means that the interface module 206 can interact with the service provider 108 at times that are not necessarily driven by the user's interaction with the page 104 displayed on the user interface presentation 134. For example, assume that the user enters a request into the page 104. The browser module 130 may attempt to address the request without interaction with the service provider 108 (if possible). But even if interaction with the service provider 108 is required, the interface module 206 can handle this request in a manner which is decoupled from the user's continued interaction with the page 104. This means that the user may be able to continue interacting with the page 104 while the browser module 130 addresses the request. Various technologies can be used to implement the asynchronous aspects of the browser module 130. In one case, the browser module 130 can implement asynchronous operations using, without limitation, Ajax technology or Ajax-like technology. Ajax is an acronym for Asynchronous JavaScript and XML. Ajax uses an XMLHttpRequest object to asynchronously interact with the service provider 108.

Turning to the data capture module 202 in greater detail, this component can perform two roles, represented by a layout capture module 208 and an event handling module 210. The purpose of the layout capture module 208 is to determine the layout of the page 104 as it is rendered on the particular presentation device 132 of the user device 104. The layout is represented by layout data. The layout data may express information regarding the overall dimensions of the page 104 as well as information regarding the position of features that are located within the page 104, such as representative feature 106. As stated, the term "feature" refers to any identifiable aspect of the page 104. In another implementation, the layout capture module 208 only captures the location of certain features of interest within the page 106, such as the location of advertisements within the page, or the location of certain sections within an item detail page.

In one implementation, the layout capture module 208 captures the layout data when the browser module 130 first renders the page 104 (or shortly thereafter). In another implementation, the layout capture module 208 can capture the layout data at a later point in time, e.g., after the user has interacted with the page 104 to some extent. In another implementation, the layout capture module 208 can capture the layout data at multiple points in time to account for any potential changes in the layout. In any case, the layout capture module 208 captures the layout as it is rendered on a particular presentation device 132 because different presentation devices 132 may render the page 104 in different ways, producing different layout data. For example, a page 104 displayed by a personal computer may have a different layout than the same page rendered by a personal digital assistant (PDA), as the PDA may truncate or condense certain information to accommodate a smaller-sized screen surface. The explanation below provides additional information regarding the operation of the layout capture module 208.

As stated, the purpose of the event handling module 210 is to collect event data regarding the user's interaction with the page 104. The user may engage the page 104 in various ways.

Thus, the event handling module 210 can collect different types of event data. The following list enumerates, without limitation, some of the types of event data that the event handling module 210 can collect:

One type of event data corresponds to scrolling event data. This data is generated when the user scrolls the page 104 up and down or left and right in conventional fashion.

Another type of event data corresponds to dimension-modifying event data. In one case, the user generates this data when the user changes the dimensions of a user interface panel that is used to the present the page 104 on the user interface presentation 134. This data is generated by changing the width of the panel, and/or changing the height of the panel, and/or making some other change to the dimensions of the panel. In one case, a dimension-modifying event may reduce or increase the amount of information that is made visible to the user at any one time. Alternatively, or in addition, a dimension-modifying event can cause content within the user interface panel to be modified, such as when a three-line text message is displayed as a five-line text message to accommodate the presentation of the entire message in a width-reduced user interface panel. One way that a user can change the dimensions of a panel is by clicking on and dragging an edge of the panel in a conventional manner.

Another type of event data corresponds to graphical position-modifying event data. This data is generated by moving a graphical positioning device (such as a mouse device). The movement of the graphical positioning device may cause a marker (such an arrow or cursor) to move within the content.

Another type of event data comprises focus-switching event data. This type of data is generated when focus is switched from one portion of content to another. In one instance, a user causes the generation of focus-switching event data when the user switches from one tabbed active page to another tabbed active page. In another instance, the user causes the generation of focus-switching event data when the user switches from an active page to an active application or a newly launched application. In these examples, the page that loses focus is not deactivated; the loss of focus essentially pauses the consumption of this page until the user optionally returns to it at a later time. The event handling module 210 can determine the amount of time that the user has spent away from active content based on, in part, a consideration of the time information associated with the user's actions (described below). The focus-switching event data itself reflects switching away from a portion and switching back to the portion.

Another type of event data comprises targeted actions made by the user with respect to content delivered by the page 104. For example, the event data can reflect the user's selection of certain features in the page (such as by clicking on the features). Consider the case in which a feature corresponds to a merchandisable item. The user may select an item to retrieve additional information regarding an item, to place the item in a shopping cart, to purchase the item, and so forth. This type of event data can also encompass other types of desired actions, such as filling out a form, etc.

Another type of event data corresponds to time information. The time information reflects the timing at which the user performs any kind of interaction with the page 104. For example, the time information may be expressed as timestamps that identify the times at which the user performed various actions. The timestamps can convey the timing information relative to an initial time when the user first activates the page 104. Or the timestamps can convey the timing information relative to some other reference time. As explained above, length-of-consumption information can be obtained based on the time information, reflecting the amount of time that a user likely consumed a particular feature.

In one case, the event handling module 210 and local data store 204 maintain separate records for respective pages with which the user interacts. For example, the event handling module 210 can store a first collection of event data associated with the user's interaction with a first tagged active page and a second collection of event data associated with the user's interaction with a second tagged active page. Thus, if the user is toggling back and forth between these two pages in a user session, the event handling module 210 can route the collected event data to the appropriate collections of event data. The event handling module 210 can identify different active pages using page ID information or the like.

The browser module 130 can send the collected data to the service provider 108 in different ways. In one case, the browser module 130 can communicate event data by identifying one or more of: ID information which identifies the type of an event (e.g., scrolling event data versus dimension-modifying event data); position information which identifies position data associated with the event (such as the vertical position of a scroll bar associated with a scrolling type event); time information which identifies the timing of the event (e.g., relative to the loading of the page); page ID information which identifies the page with which the user is interacting; user session information, and so on.

FIGS. 3A-3F show various user interface presentations, illustrating different scenarios in which the actions of users cause the generation of different types of event data. By way of overview, the user interface presentations show a particular page 302 within a user interface panel, which, in turn, is presented on the user interface presentation 134 of the presentation device 132. By way of illustration, this particular page 302 is a page that presents detailed information about a particular item—in this case, a camera. This page may be referred to as an item detail page. The item can be selected by the user; for instance, the user can add the item to her cart, purchase the item, and so on.

The page 302 is relatively long. As such, the length of the page 302 may exceed the length of the user interface panel, thereby preventing all of the page 302 from being viewable at one time. Thus, to view different portions of the page 302, a user can operate a vertical scrolling bar 304 in conventional fashion. Scrolling event data can be collected to reflect the movement of the vertical scrolling bar 304. The position of the vertical scroll bar 304 can be expressed by specifying the location of the scroll bar 304 along the vertical extent of the page 302, e.g., using pixel data or some other unit of positional measurement.

Figure 3A:
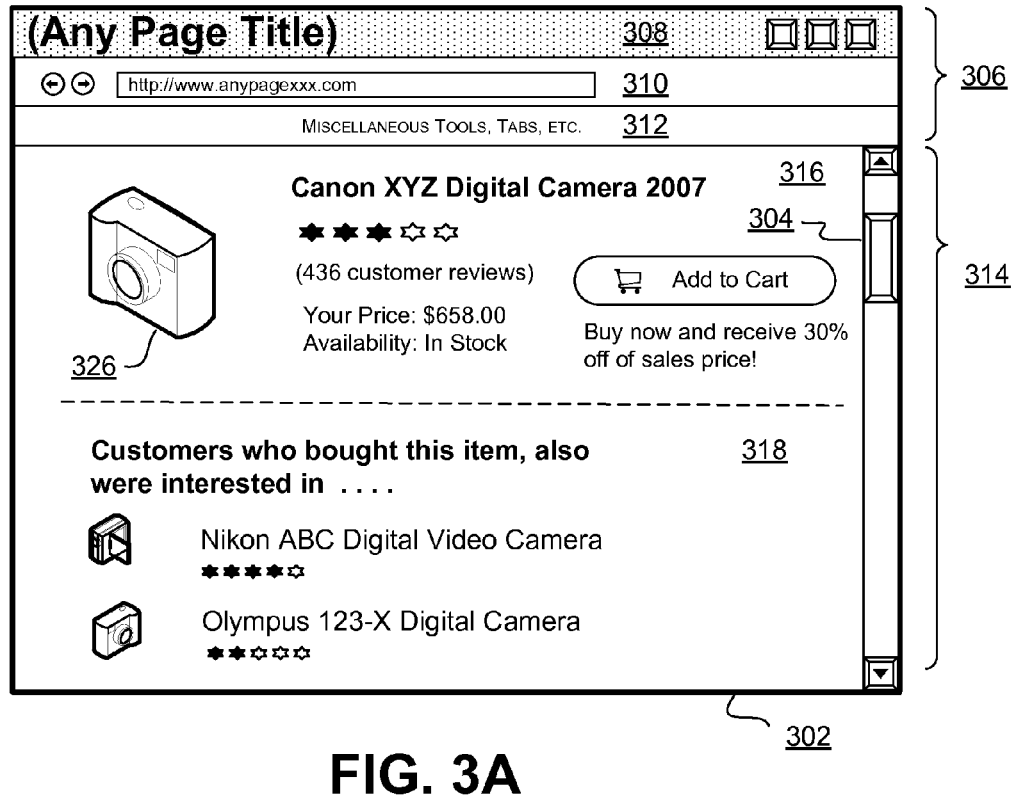
FIGS. 3A-3C show a user interface presentation that displays a page of content, the entire contents of which cannot be displayed at one time; in each figure, the user interface presentation displays a different portion of the content associated with different respective vertical scroll bar positions.
Figure 3B:
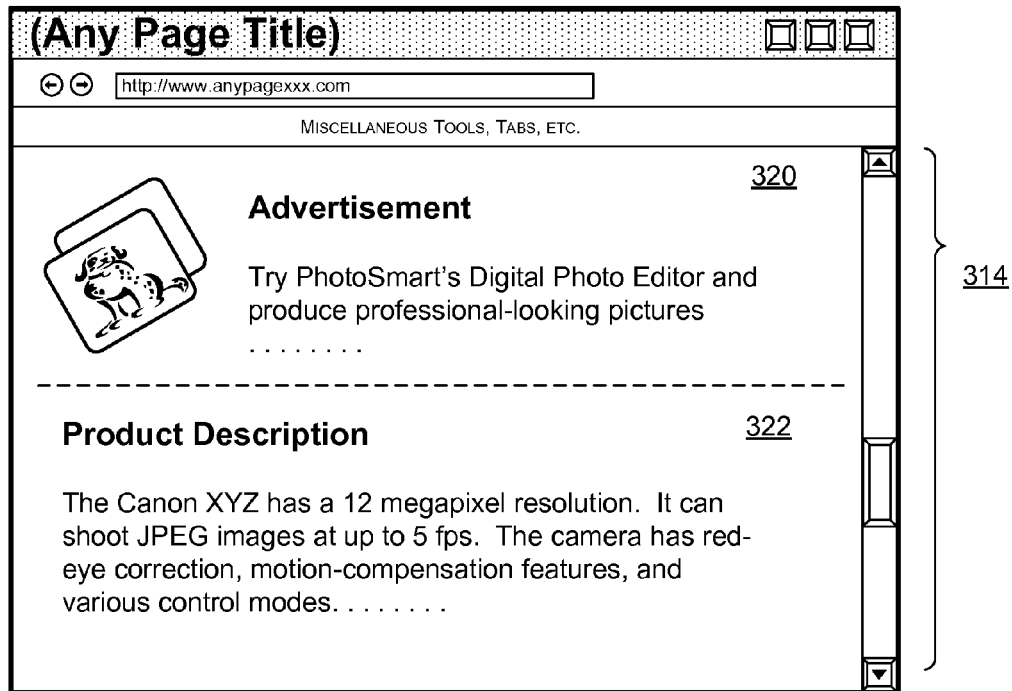
Figure 3C:
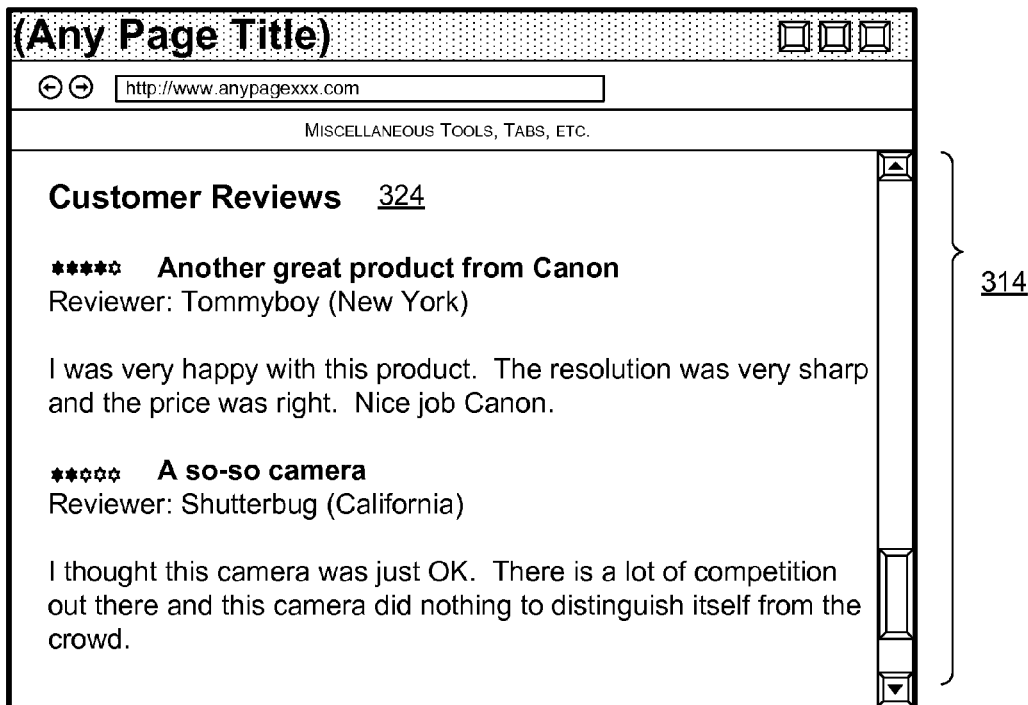

FIGS. 3A-3C depict the page 302 for different respective positions of the scroll bar 304, causing different portions of the page 302 to come into view. Although not shown, the page 302 can also (or alternatively) include a horizontal scroll bar to move the page 302 back and forth in a horizontal (i.e., lateral) direction. Likewise, the page 302 can have a width which exceeds the width of the lateral dimension of the user interface panel.

The page 302 can include other conventional components. For example, as illustrated in FIG. 3A, the page 302 can include a header portion 306 that includes various sections. For example, the header portion 306 can include a conventional title bar 308, a site address section 310, a section 312 that includes various selectable icons, menus, tabs, etc., and so forth.

The page 302 can also include a main content section 314. The main content section 314 can include various component sections. All of the sections may not be visible to the user at any given time. To view a section that is not currently visible, the user can operate the vertical scroll bar 304 to move the main content section 314 so that the desired component section becomes visible. In a first view of the page 302 shown in FIG. 3A, the page 302 includes a main item description section 316 (that presents an overview of the merchandisable item), and a related item section 318 (that presents information regarding items that are related to the item shown in section 316). In a second view of the page shown in FIG. 3B, the page 302 includes an advertisement section 320 (that presents information regarding one or more advertisements), and a product detail section 322 (that presents detailed information regarding the item shown in section 316). In a third view of the page shown in FIG. 3C, the page 302 includes a customer review section (that presents one or more reviews of the merchandisable item by one or more customers or other users). It will be appreciated that the particular page 302 shown in FIGS. 3A-3C is merely representative of any type of content that can be presented to the user. Pages can have any number of sections, any number of page views, any kind of sections, and so forth.

Figure 3D:
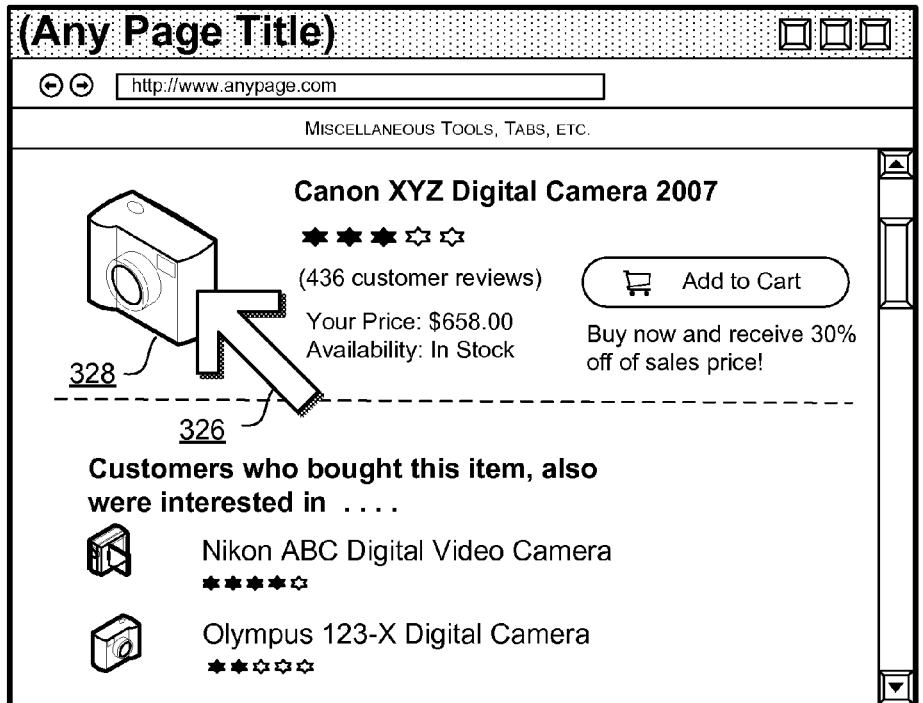
FIG. 3D shows a user interface presentation that displays content together with a graphical mark controlled by a graphical positioning device.

FIG. 3D shows a graphical mark 326 (such as an arrow), which the user can move by moving a graphical positioning device, such as a mouse device. Movement of the graphical mark 326 causes the generation of graphical position-modifying event data. In this case, the user has moved the mark 326 to point to a picture 328 of an item. From this behavior, the data analysis module 124 may infer that the user is consuming (e.g., viewing) the picture 328. Note that event data does not rely on the picture 328 incorporating any type of special selectable field. In other words, the picture 328 need not be preconfigured to detect mouse-over events. Rather, the graphical position-modifying event reflects raw position data, and the data analysis module 124 uses this data to infer the fact that the user is likely looking at the picture 328.

Figure 3E:
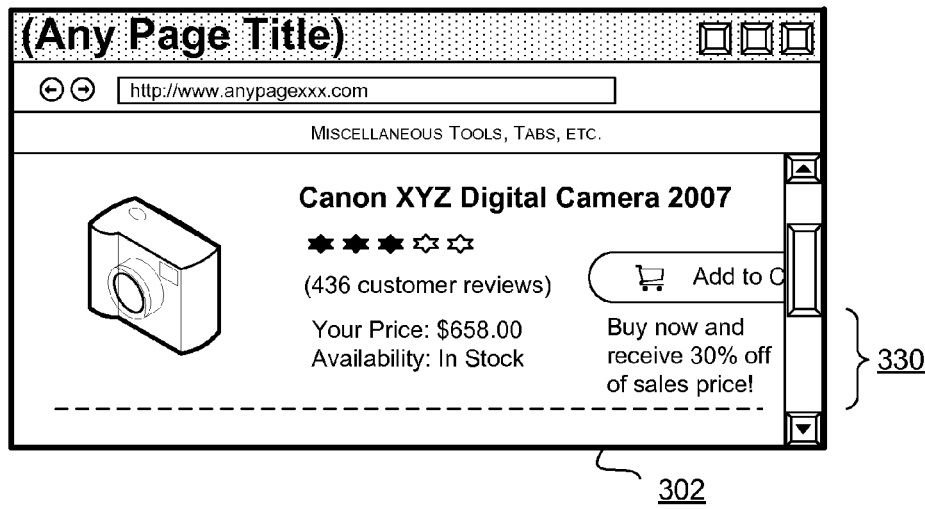
FIG. 3E shows a user interface presentation having modified dimensions relative to the user interface presentation shown in FIG. 3A.

FIG. 3E shows a user interface panel that is smaller relative to the user interface panel shown in FIG. 3A. Namely, the user has decreased both the width and the height of the user interface panel relative to the panel shown in FIG. 3A. This type of behavior generates dimension-modifying event data. Note that, as one consequence of the dimension-modifying behavior, less content of the page 302 is made visible to the user at any one time. Also note that the content may include one or more portions (such as textual portion 330) that is redisplayed to accommodate the change in panel dimensions; namely, the textual portion 330 is laterally compressed, such that it now requires three lines to display, instead of two (as in FIG. 3A).

Figure 3F:
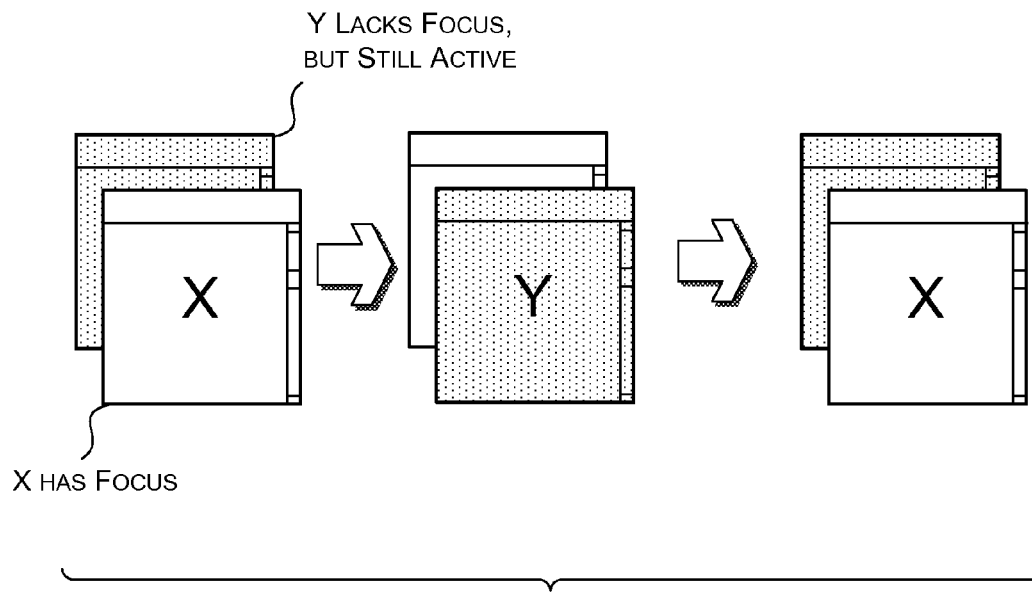
FIG. 3F shows a sequence of user interface presentations in which focus is switched from first active content to second active content, and then back again.

FIG. 3F shows a series of focus-switching actions taken by a user, switching from a first state in which an active page X has focus and another active page Y does not, a second state in which the Y page has focus and the page X does not, and a third case, in which the user returns to the first state—that is, in which the page X has focus. This type of event data corresponds to focus-switching event data. A similar operation occurs when the user switches between an active page and an application, such as an active application that is accessible via the user's desktop, or a newly launched application. Using collected time information, the data analysis module 124 can determine how long page X lost focus in the transition from page X to page Y, and back again. The focus-switching event data itself reflects switching away from a portion and switching back to the portion.

FIGS. 3A-3F do not exhaustively enumerate the types of actions that the user may make while interacting with the page 302. Other types of event data can be generated in response to other types of user actions.

Figure 4:
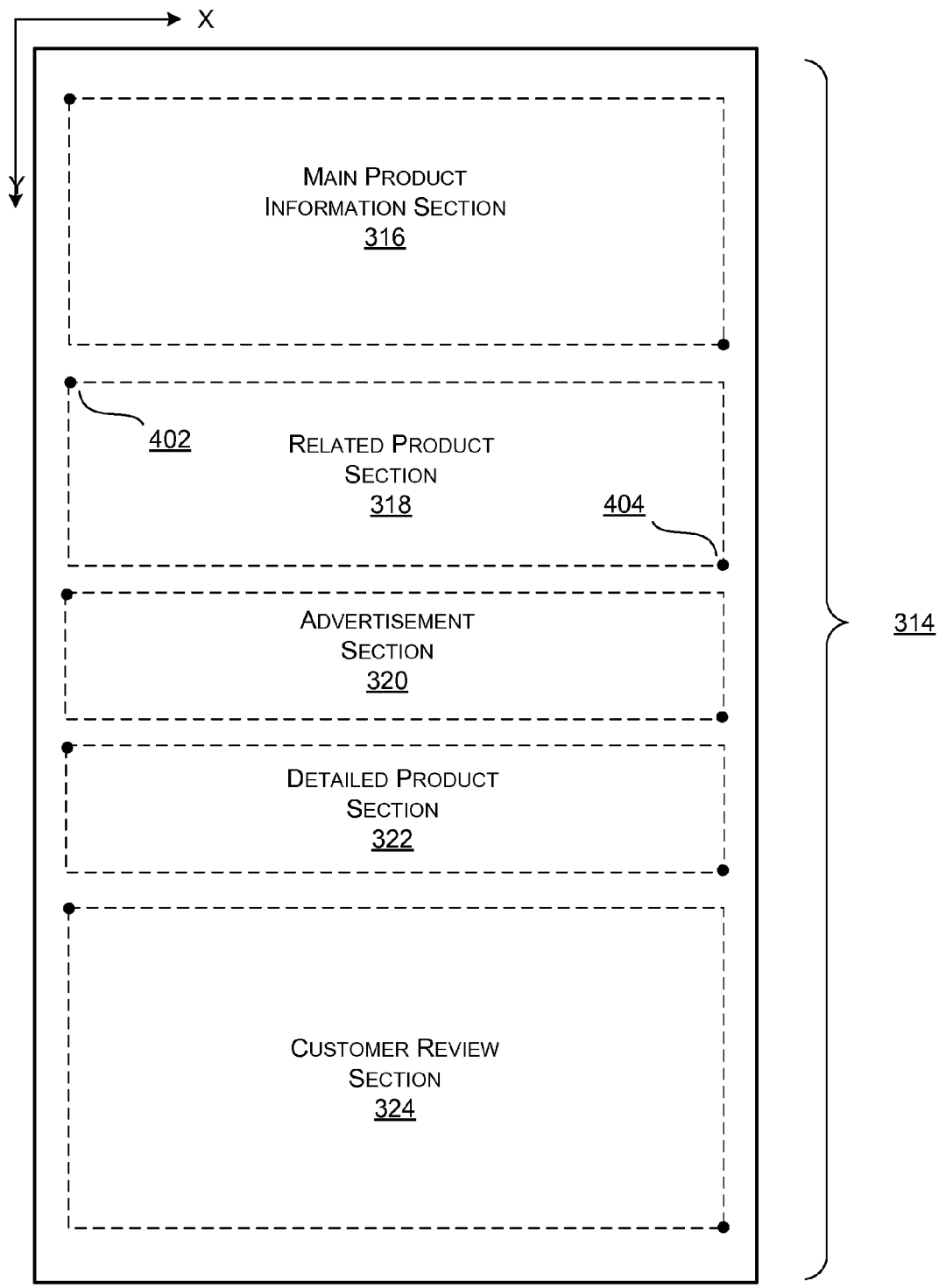
FIG. 4 is a pictorial diagram illustrating layout data which reflects the layout of the content shown in FIGS. 3A-3C.

FIG. 4 shows the overall layout of the main content section 314. This main content section 314 includes the above-described main product information section 316, related product section 318, advertisement section 320, detailed production section 322, and customer review section 324. Each of these sections may correspond to a distinct feature of the page 302. Individual parts of the sections may also correspond to features. For example, individual customer reviews within the customer review section 324 may correspond to different features.

The layout capture module 208 can register the location of the various features in the page 302 in different ways. In one technique, the layout capture module 208 can represent the placement of features in the page using an X-Y coordinate system. In one case, the layout capture module 208 can identify positions in this coordinate system in units of pixels. For example, the overall layout of the page 308 can be represented by its complete horizontal span in pixels and its complete vertical span in pixels. The position of any feature within the page 302 can be represented by specifying the location of various reference points associated with the feature. For example, one way to represent the location of section 318 is to identify the X-Y coordinates of points 402 and 404, which represent two opposing corners of the section 318. Another way of presenting the location of section 318 is to note the X-Y coordinates of point 402 together with an indication of the size of the section 318. The layout capture module 208 can represent the location of the features in yet other ways.

The event handling module 210 can register various events in a manner which complements the layout capture module's 208 description of the layout of the page 302. For example, assume that the user has moved the scroll bar 304 to a certain position relative to the vertical extent of the page 302. The event handling module 210 can register the vertical position of the scroll bar 304 relative to the height of the page 302, which can be expressed using any coordinate system and any type of units, such as pixels. The data analysis module 124 (of the service provider 108) can correlate the scroll bar position with the section of the page 302 that the user is likely to be viewing at this particular time. That is, if feature Z is at vertical position S on the page (with reference the vertical scroll bar), and if the scroll bar 304 is positioned near position S, then the data analysis module 124 can conclude that the user is looking at feature Z.

A.3. Illustrative Processing Functionality

FIG. 5 shows illustrative processing functionality 500 that can be used to implement any feature of the environment 100 shown in FIG. 1, such as the service provider 108, the user device 110, and so forth. The processing functionality 500 can represent, without limitation, any one or more of: a personal computer; a laptop computer; a server-type computer; a an electronic reader device; a portable media player device; a personal digital assistant (PDA) device; a mobile telephone device; a tablet-type input device; any kind of wearable device; a game console device; a set-top box device, and so on. To facilitate discussion, the processing functionality 500 is described below as specifically implementing the representative user device 110, although the generic processing functionality 500 also sets forth an architecture of a server-type computer that can be used to implement any aspect of the service provider 108.

In the local device context, the processing module 128 can comprise one or more processing units 502 (such as a CPU, etc.), RAM 504, ROM 506, media modules 508 (such as a hard drive, DVD drive, etc.), network interface 510 (such as a telephone or cable modem, broadband connectivity mechanism, etc.), and an I/O interface 512 for interacting with input devices and output devices. One or more buses 514 couple the above-described modules together.

The output device(s) can include the presentation device 132, which presents the user interface 134. The input module(s) 136 can include any one or more of a keyboard, mouse input device, track ball input device, touch sensitive screen, and so forth.

Various functions can be implemented as machine-readable instructions that reside in any storage unit or combination of storage units shown in FIG. 5, and the processor unit 502 can execute these instructions to produce desired operations.

B. Illustrative Procedures

Figure 8:
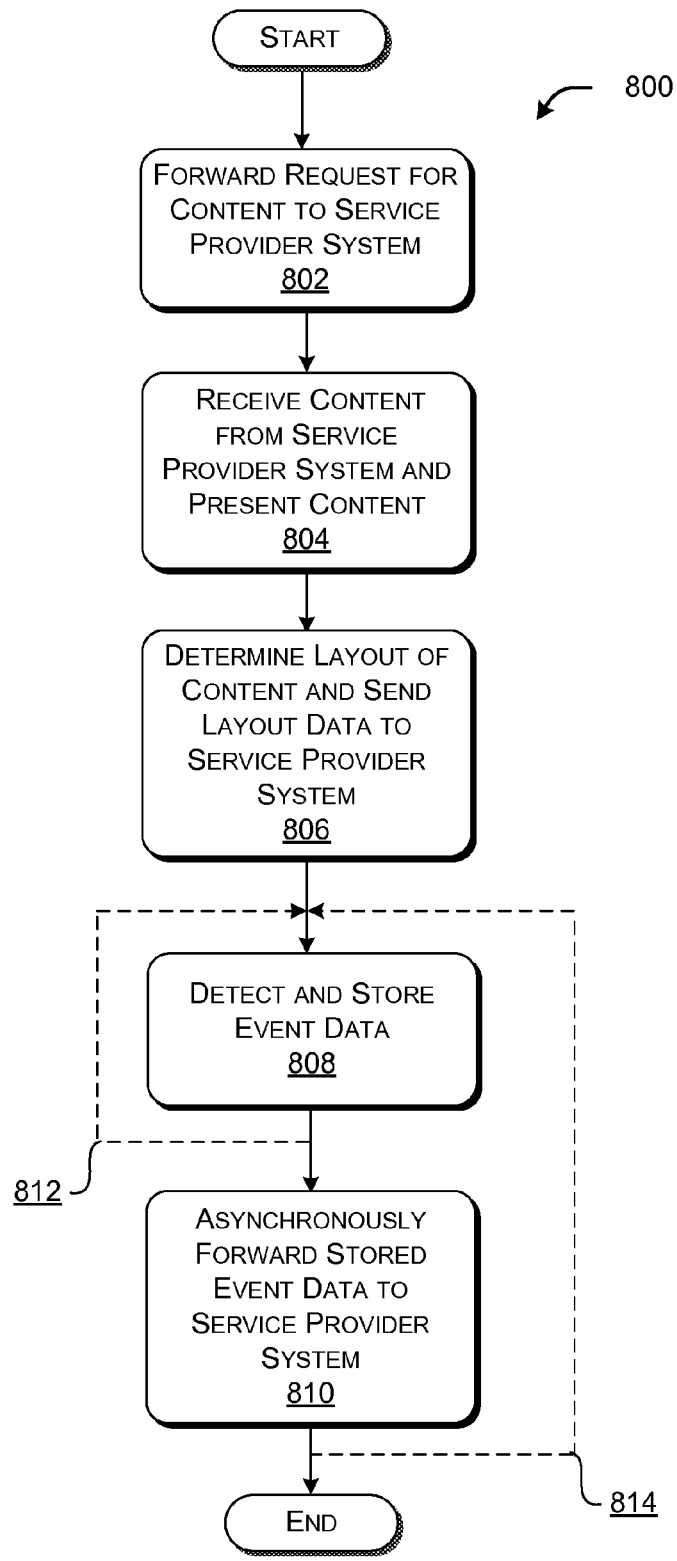
FIG. 8 shows an illustrative procedure for collecting layout data and event data from the perspective of the browser module.

FIGS. 6-8 describe the operation of the environment 100 of FIG. 1 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, or by a combination of these elements.

B.1. Behavior of the Service Provider: Collecting Data

FIG. 6 shows an illustrative procedure 600 for collecting data that represents the user's consumption of features within a displayed page, such as the representative page 104, from the perspective of the service provider 108.

In operation 602, the service 102 receives a request from the user device 110 to display content. This request may take the form of an HTTP request to display a page 104 identified in the request. The page 104 may correspond to an item detail page, such as the page 302 shown in FIGS. 3A-3C.

In operation 604, the service 102 delivers the requested page 104 to the user device 110. This page 104 can be delivered to the user device 110 via the network 112 (which may represent the Internet). The page 104 includes executable content 118. The executable content 18, when executed, implements the capture module 202 and local data store 204 shown in FIG. 2; for instance, the local data store 204 can correspond to a variable in the executable content 118 which is used to receive event data, upon execution of the content 118. The page can have a length which prevents its entire content form being viewable by the user interface presentation at the same time.

In operation 606, the data logging module 120 receives layout data when the user device's browser module 130 renders the page 104 on the presentation device 132. The layout data can represent the overall dimensions of the page 104 as well as the position of various features within the page 104 (or only a set of features within the page 104 that are of interest). The data logging module 120 stores the layout data in the data store 122.

In operation 608, the data logging module 120 receives event data that reflects the user's interaction with the page 104. As described above, this event data may reflect scrolling activity, dimension-modifying activity, graphical position-modifying activity, focus-switching activity, and/or some other activity. The data logging module 120 can also register express actions that the user may take with respect to individual features on the page 104, such as when a user clicks on an item in the page 104. The data logging module 120 can also record timing information that identifies that time at which various user activity occurred. The dashed-line loop 610 indicates that the data logging module 120 can collect a sequence of event information over the course of the user's interaction with the page 104. The data logging module 120 can associate a collection of event data with a user session, so it can be analyzed by the data analysis module 124 as a collection of data. The data logging module 120 can alternatively, or in addition, group collected event data based on other considerations.

B.2. Behavior of the Service Provider: Analyzing Data

FIG. 7 shows a procedure 700 which identifies one manner of operation of the data analysis module 124 and the analysis application module 126. The purpose of the data analysis module 124 is to analyze the data collected by the data logging module 120. The purpose of the analysis application module 126 is to apply the results of the analysis generated by the data analysis module 124.

In operation 702, the data analysis module 124 retrieves the collected data from the data store 122. The retrieved data can comprise layout data and event data collected over the course of the user's interaction with the page 104.

In operation 704, the data analysis module 124 uses the layout data and the event data to identify at least one feature that the user is likely to be consuming in the course of the user's interaction with the page 104. To make this determination, the data analysis module 124 can: (1) identify a location on the displayed page associated with the event data; and (2) identify, with reference to the layout data, a feature associated with the identified location. For example, assume that the user moved the scroll bar 304 so as to display the bottom part of the page 302 (corresponding to the page view shown in FIG. 3C). The data analysis module 124 can first identify a location associated with the scroll bar position (which may be expressed as a vertical position value relative to the entire height of the page 302). The data analysis module 124 can then consult the layout data to determine that the identified location correlates with the customer review section 324 of the page 302. Hence, the data analysis module 124 can determine that the user was likely looking at the review section 324 at this particular point in time, even though the user may not have made any express action with respect to this section 324. For example, the user may not have clicked on this section 324, as this section may not even include a clickable field.

In one illustrative implementation, the data analysis module 124 can consider time information in determining whether a feature was likely consumed. That is, the time information can be used to determine how long the user likely spent consuming a certain feature in the page 104, e.g., by determining an interval of time that separates two events. The data analysis module 124 can weight the user's actions based on such time information. For instance, the data analysis module 124 can ignore scrolling event data that suggests that the user rapidly passed by a feature on the page 104.

In operation 706, the data analysis module 124 can optionally perform higher-level analysis based on the results of operation 704. For instance, the data analysis module 124 can determine a sequence of the features consumed by the user, and the length of time that the user likely spent consuming each feature in the sequence. The data analysis module 124 can also determine an estimated actual impression measurement. The data analysis module 124 can perform this operation by aggregating the analysis performed in operation 704 with respect to multiple instances of consumption, such as multiple instances of consumption produced by multiple users. The data analysis module 124 can also perform aggregative analysis with respect to actions made by a single user over time.

Operation 706 can also involve correlating a user's consumption of features within the page 104 (e.g., based on scrolling event data and/or resizing event data) with a desired user action, such as adding an item to a cart, purchasing an item, filling out a form, making a contact with a sales representative, registering for a service, and so on. For example, operation 706 can determine that a user's viewing of feature L (e.g., as determined based on scrolling event data) correlates with the user's later selection (e.g., purchase) of item M or other desired action. Operation 706 can also determine how a sequence of feature-consumptions may have lead to a desired action, paying, in one case, particular heed to a last feature that is consumed in the sequence. Operation 706 can also aggregate this type of analysis with respect to a group of users.

In operation 708, the analysis application module 126 can use the results provided in operation 706 in various ways. For example, the analysis application module 126 can use an impression measurement to modify the page 104 to favor certain sections relative to other sections. The analysis application module 126 can optionally remove sections that do not appear to be attracting sufficient user attention. In a variation of this technique, the data analysis module 124 and the analysis application module 126 can perform experiments with the design of the page 104, e.g., by making a change in the page 104 and then noting how this change affects user behavior. That is, the data analysis module 124 can determine whether the change produces desired results by comparing pre-change user behavior with post-change user behavior.

According to another use, the analysis application module 126 (or some other module or combination of modules) can maintain accounting records regarding the determined likely consumption of features. The analysis application module 126 can use this information as one factor in determining a price to charge an advertiser (or other entity associated with the feature). For example, consider the case in which a feature corresponds to an advertisement. The data analysis module 124 can determine whether users are viewing the advertisement based on the event data, even through the users may not have expressly clicked on the advertisement. The analysis application module 126 can use this knowledge to compute an estimated actual impression measurement, and then use this measurement to modify the way that it charges the entity for presentation of an advertisement.

B.3. Behavior of the Browser Module: Collecting Data

FIG. 8 illustrates a procedure 800 for collecting data from the perspective of the browser module 130.

In operation 802, the browser module 802 can forward a request for content to the service 102 of the service provider 108. The requested content may correspond to the representative page 104.

In operation 804, the browser module 802 can present the page 104 on the presentation module 130. The page 104 can include executable content 118 (such as script-based content) which governs the recording and reporting of data.

In operation 806, the browser module 804 determines the layout of the page 104 as rendered on the presentation module 130 and sends layout data to the service provider 108.

In operation 808, the browser module 130 detects and stores event data that reflects the user's interaction with the page 104. This event data may reflect scrolling activity, dimension-modifying activity, focus-switching activity, and/or some other type of activity. The browser module 130 can store this event data in its local data store 204.

In operation 810, the browser module 130 can forward data in its store 204 to the service provider 108. This sending operation can be performed asynchronously with respect to the user's interaction with the page 104.

A first dashed-line loop 812 indicates that the data capture module 202 continues to store event data in the local data store 204 until this information is flushed and sent to the service provider 108 in an asynchronous manner. The second dashed-line loop 814 indicates that that the flushing and sending operation is repetitively performed throughout the user's interaction with the page 104.

Although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A computer-implemented method, comprising:
receiving, from a plurality of user devices, event data that reflects consumption of content by a collection of users;
receiving, from the plurality of user devices, layout data that indicates positioning of a plurality of non-advertising features within the content and positioning of a plurality of advertising features within the content;
analyzing, by one or more processors, the event data and the layout data to identify at least one non-advertising feature from the plurality of non-advertising features within the content that at least some of the collection of users are presumed to have consumed; and
determining, based at least in part on the analyzing, a measurement that reflects aggregate consumption of the at least one non-advertising feature within the content by the at least some of the collection of users.

2. The computer-implemented method of claim 1:
wherein the event data comprises scrolling event data that reflects scrolling activity performed by the collection of users;
further comprising determining locations within the content that the collection of users access based at least in part on the scrolling activity; and
wherein the analyzing further includes analyzing the locations to determine the at least one non-advertising feature.

3. The computer-implemented method of claim 1:
wherein the event data comprises dimension-modifying event data that reflects modification to dimensions of user interface panels that present the content to the collection of users;
further comprising determining locations associated with the dimension-modifying event data; and
wherein the analyzing further includes analyzing the locations to determine the at least one non-advertising feature.

4. The computer-implemented method of claim 1:
wherein the event data comprises graphical position-modifying event data that reflects movement of graphical positioning devices by the collection of users;
further comprising determining locations interacted with using the graphical position-modifying event data; and
wherein the analyzing further includes analyzing the locations to determine the at least one non-advertising feature.

5. The computer-implemented method of claim 1:
wherein the event data comprises focus-modifying event data that reflects changes in focus away from a content portion or back to the content portion by the collection of users;
further comprising determining locations viewed using the focus-modifying event data; and
wherein the analyzing further includes analyzing the locations to determine the at least one non-advertising feature.

6. The computer-implemented method of claim 1, further comprising modifying the content based at least on the measurement.

7. The computer-implemented method of claim 6, wherein the modifying the content includes increasing a size of the at least one non-advertising feature in a webpage and eliminating, from the webpage, another feature having another measurement that is lower than the measurement.

8. The computer-implemented method of claim 1, further comprising evaluating a price to be charged for presentation of the at least one non-advertising feature based at least on the measurement.

9. The computer-implemented method of claim 8, further comprising increasing the price by an offset in response to the measurement indicating that an actual popularity of the at least one non-advertising feature is greater than an estimated popularity of the at least one non-advertising feature.

10. A system comprising:
a data store configured to store event data stored in response to consumption of content by a collection of users and layout data that indicates positioning of a plurality of non-interactive features within the content and positioning of a plurality of interactive features within the content; and
one or more processors in communication with the data store, the one or more processors configured to at least:
access the event data and the layout data; and
analyze the event data and the layout data to determine at least one non-interactive feature of the plurality of non-interactive features in the content that the one or more users are presumed to have consumed.

11. The system of claim 10, wherein the data store stores the event data in response to at least one of:
scrolling activity performed by a user;
at least one change in a dimension of a user interface panel that presents the content;
a change in position of a graphical mark provided by a graphical positioning device; or
a change in focus away from a portion of the content or back to the portion of the content.

12. The system of claim 10, wherein the one or more processors are further configured to determine an estimated actual impression measurement for individual ones of the plurality of non-interactive features by aggregating the event data and the layout data for a plurality of users.

13. The system of claim 12, wherein the one or more processors are further configured to modify the content based at least on the estimated actual impression measurements for one or more of the plurality of non-interactive features.

14. The system of claim 13, wherein the one or more processors are further configured to modify the content by increasing a first display size of a first non-interactive feature having a first estimated actual impression measurement and decreasing a second display size of a second non-interactive feature having a second estimated actual impression measurement that is lower than the first estimated actual impression measurement.

15. The system of claim 12, wherein the one or more processors are further configured to evaluate a price to be charged for presentation of an interactive feature based at least on the estimated actual impression measurement of a non-interactive feature.

16. The system of claim 15, wherein the one or more processors are further configured to increase the price by an offset when the estimated actual impression measurement indicates that an actual popularity of the non-interactive feature is greater than an estimated popularity of the non-interactive feature from which the price was established.

17. One or more non-transitory computer-readable storage media storing computer-executable instructions that, when executed, cause one or more processors to:
access layout data that indicates positioning of a plurality of features within a document;
capture event data associated with consumption of the document by a user; and
analyze the event data and the layout data to determine at least one feature in the document that the user is presumed to have consumed.

18. The one or more non-transitory computer-readable storage media of claim 17, wherein the capture of the event data comprises at least one of:
capture of scrolling activity performed by the user;
capture of at least one change in a dimension of a display panel that presents the document;
capture of a change in position of a graphical mark provided by a graphical positioning device; or
capture of a change in focus away from a portion of the document or back to the portion of the document.

19. The one or more non-transitory computer-readable storage media of claim 18, wherein the instructions cause the one or more processors to transmit an indication of the at least one feature to a remote computing device.

20. The one or more non-transitory computer-readable storage media of claim 18, wherein the document is made accessible, via a network, to the user.

* * * * *